(12) United States Patent
Mohammed et al.

(10) Patent No.: US 7,007,059 B1
(45) Date of Patent: Feb. 28, 2006

(54) FAST PIPELINED ADDER/SUBTRACTOR USING INCREMENT/DECREMENT FUNCTION WITH REDUCED REGISTER UTILIZATION

(75) Inventors: Haneef D. Mohammed, Beaverton, OR (US); Larry Hemmert, Oregon City, OR (US)

(73) Assignee: Cypress Semiconductor Corporation, San Jose, CA (US)

( * ) Notice: Subject to any disclaimer, the term of this patent is extended or adjusted under 35 U.S.C. 154(b) by 657 days.

(21) Appl. No.: 09/918,604

(22) Filed: Jul. 30, 2001

(51) Int. Cl.
*G06F 7/38* (2006.01)
*G06F 7/50* (2006.01)

(52) U.S. Cl. ........................ 708/706; 708/233
(58) Field of Classification Search ............. 708/233, 708/700–714
See application file for complete search history.

(56) References Cited

U.S. PATENT DOCUMENTS

| | | | | |
|---|---|---|---|---|
| 4,623,982 A | * | 11/1986 | Ware | 708/714 |
| 5,095,458 A | * | 3/1992 | Lynch et al. | 708/713 |
| 5,548,546 A | * | 8/1996 | Jang et al. | 708/706 |
| 5,619,441 A | * | 4/1997 | Bartling | 708/672 |
| 5,636,157 A | * | 6/1997 | Hesson et al. | 708/714 |
| 5,889,693 A | * | 3/1999 | Joshi et al. | 708/672 |
| 5,912,833 A | * | 6/1999 | Jang et al. | 708/707 |
| 6,199,091 B1 | * | 3/2001 | Kobayashi et al. | 708/706 |
| 6,591,286 B1 | * | 7/2003 | Lu | 708/672 |

* cited by examiner

*Primary Examiner*—Anil Khatri
*Assistant Examiner*—Chat C. Do

(57) ABSTRACT

A fast pipelined adder/subtractor using increment/decrement functions with reduced register utilization. Embodiments of the present invention replace double width registers with incrementor elements, pipelined single width registers, and pipelined carry bits. This is made possible by positioning the adder elements at the first pipestage in each of the pipelines. Single width registers are used to hold the results of the initial add/subtract operation. Single bit registers pipeline the carry bits from the adders and incrementors to the next stage. The incrementor collects the sum from one of the adder elements, the pipelined carry bit from that adder element, and the carry bit from a previous stage adder and combines them to produce a new result and carry. This new result is passed along the pipeline to the output bus of the circuit. In this fashion, no double width busses or registers are required in between individual pipestages of the pipelines.

19 Claims, 4 Drawing Sheets

FAST PIPELINED ADDER/SUBTRACTOR USING INCREMENT/DECREMENT FUNCTION WITH REDUCED REGISTER UTILIZATION

FIELD OF THE INVENTION

Embodiments of the present invention relate to the field of arithmetic circuitry employing carry/borrow logic. More specifically, embodiments of the present invention pertain to a fast pipelined adder/subtractor with reduced register utilization.

PRIOR ART

It is understood that one can increase the throughput of combinatorial designs by breaking up an arithmetic function into discrete functions and adding registers at each discrete function to "partition" the arithmetic function into smaller segments. These registers then become a pipeline to store the data until needed later in the pipeline. The tradeoff is that speed is gained at the cost of more complexity and stages of latency. Throughput is increased because several pipelines can operate simultaneously.

The classical approach to pipelining an adder is shown in FIG. 1 (Conventional Art). The data from input bus 105 is broken up into several pipelines (4 in this example) and registers are placed to hold the data in the pipeline between clock cycles. The first pipeline consists of an adder 111 with several single width registers (112–115) following. Because of the architecture of a programmable logic device, the adders and register following it can be combined in one level of logic (e.g., one logic block or "macrocell") exemplified by adder elements 110, 121, and 132. The second pipeline consists of a double width register 120, for two operands, followed by and adder element 121 and filled out with additional registers. This pattern continues until the last pipeline, which consists of several double width registers and a final adder. Data is clocked between the registers based on a system clock which thereby defines the pipestages of the pipeline.

The adders also generate a carry out bit if the result is greater than will fit in the result registers. The carry out bit is pipelined through the system by single bit carry bit registers 113, 124, and 135. The sum output is then collected from the 4 pipelines and the carry bit. Traditionally, the latency from input to output is divided by the number of pipe stages used. The addition of several pipelines that operate simultaneously is what makes the pipelined adder throughput greater than that of a purely combinatorial version.

The disadvantage of this conventional method is the necessity for double width registers throughout the pipelines in many pipestages. In PLD (Programmable Logic Device) type architectures, this becomes a big disadvantage because the number of registers is limited. In the traditional pipelined architecture, this causes unwanted usage of registers and macrocells beyond what is necessary for the generation of the logic.

It would be advantageous then, to provide a system which combines the advantages of a pipelined adder/subtractor with a reduced register count. A further need exists for a system which meets the above need while providing faster processing speed and reduced energy utilization.

SUMMARY OF THE INVENTION

Accordingly, embodiments of the present invention provide a system which reduces the register count in a pipelined adder/subtractor circuit. The present invention also provides faster processing speed and requires less energy over conventional art devices of similar function. Embodiments include a pipelined arithmetic circuit that may be implemented on a PLD.

Embodiments of the present invention are directed to a fast pipelined adder/subtractor using increment/decrement functions with reduced register utilization. Embodiments of the present invention replace double width registers with incrementor elements, pipelined single width registers, and pipelined carry bits. This is made possible by positioning the adder elements at the first pipestage in each of the pipelines. Single width registers then are used to hold the results of the initial add/subtract operation. Single bit registers pipeline the carry bit from the adder and incrementor carry out to the next stage. The incrementor collects the sum from one of the adder elements, the pipelined carry bit from that adder element, and the carry bit from a previous stage adder and combines them to produce a new result and carry. This new result is passed along the pipeline to the output bus of the circuit. In this fashion, no double width busses or registers are required in between individual pipestages of the pipelines.

The present invention utilizes multiple pipelined adder elements that are coupled with an input bus. Each adder element performs an add/subtract operation upon a pair of operands and stores the result in a single width register. Any carry bits resulting from the increment/decrement or add/subtract operations are sent to a single bit register. In the next pipestage, an incrementor is coupled with the single width register of one of the adder elements, the carry bit register of that same adder element, and the carry bit register of the adder element of the preceding stage. The incrementor outputs a new result and carry bit. The carry bit is pipelined through all of the stages and the result is carried in single width registers through the pipeline to an output line.

One advantage of the present invention is that it maintains the high throughput of conventional art designs while reducing the need for double width registers. There are now no double registers. The register complexity is replaced by a simpler and smaller incrementor element and some single bit registers for the carry bits. This is a distinct advantage for the architectures found in PLD type devices which have fewer available resources than gate array resources. By reducing the area the design occupies, there are also advantages in circuit performance due to having a more compact arrangement with smaller connect distances resulting in smaller delays and reduced power utilization.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION

In the following detailed description of the present invention, a fast pipelined adder/subtractor using increment/decrement function with reduced register utilization, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Figure 1:
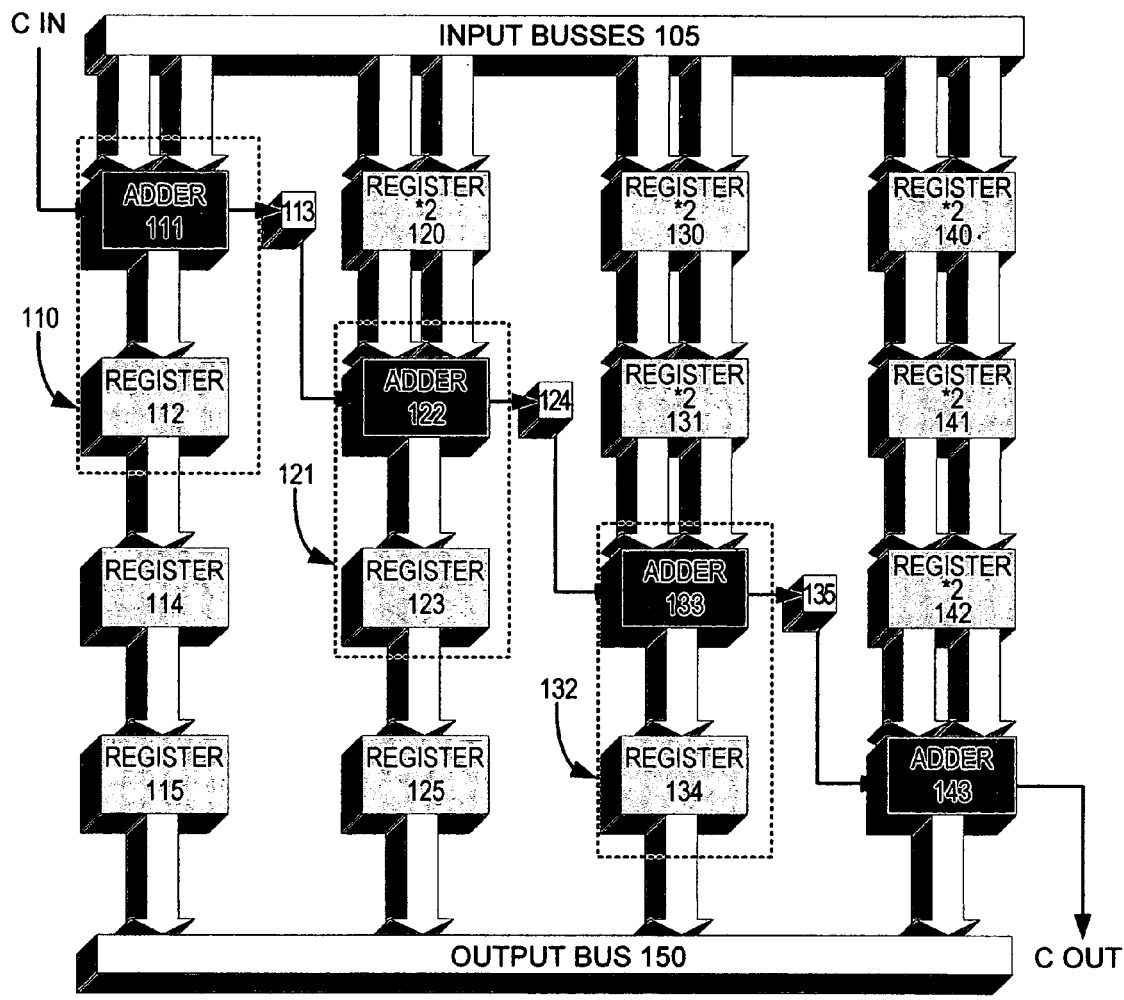
FIG. 1 is a block diagram of a prior art pipelined adder/subtractor.
Figure 2:
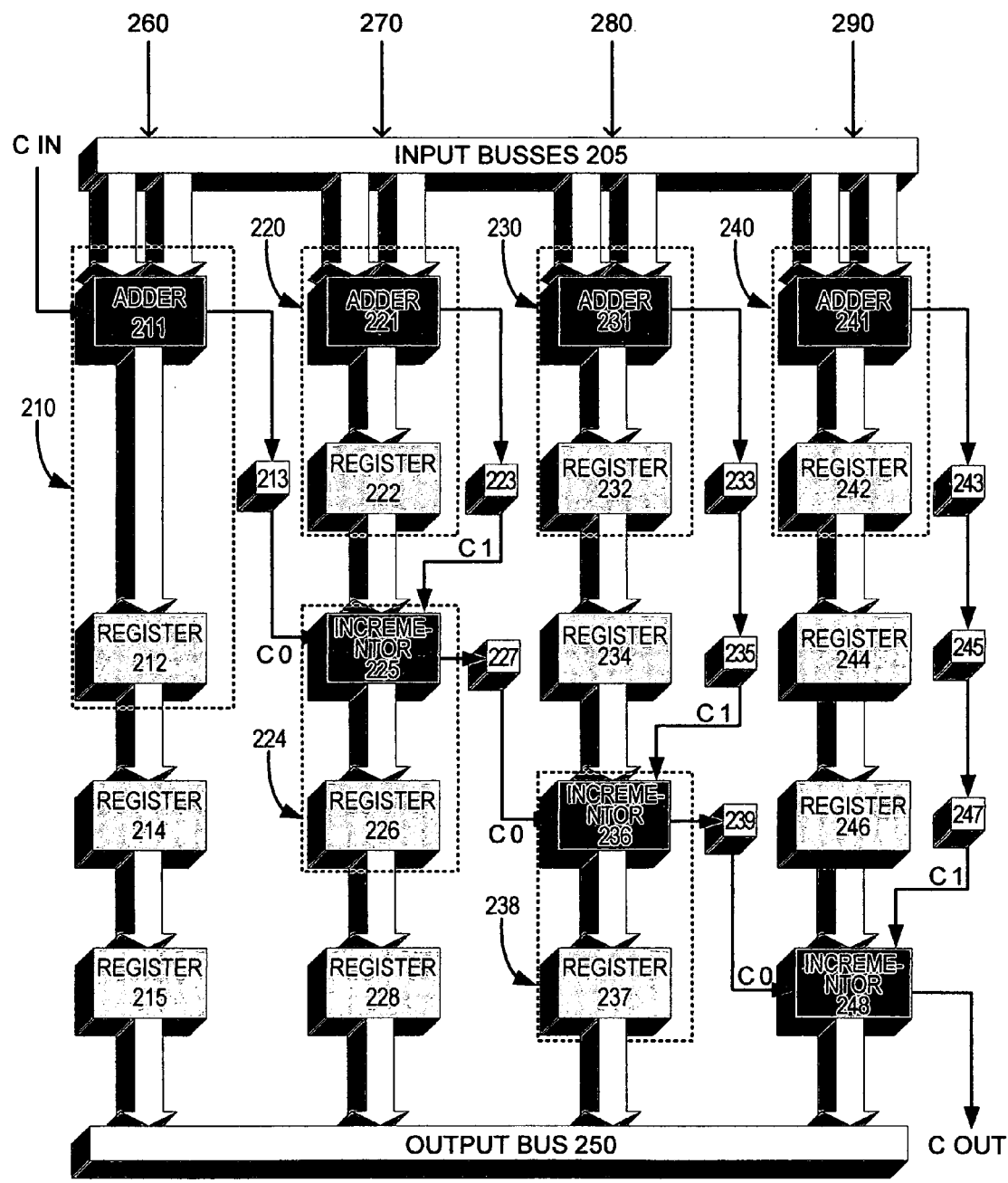
FIG. 2 is a block diagram of a pipelined adder/subtractor as embodied by the present invention.

FIG. 2 is a block diagram of the pipelined adder/subtractor circuit 200 of the present invention. For purposes of clarity, the following discussion will utilize the block diagram of FIG. 2 in conjunction with flow chart 300 of FIG. 3, to describe one embodiment of the present invention.

Figure 3:
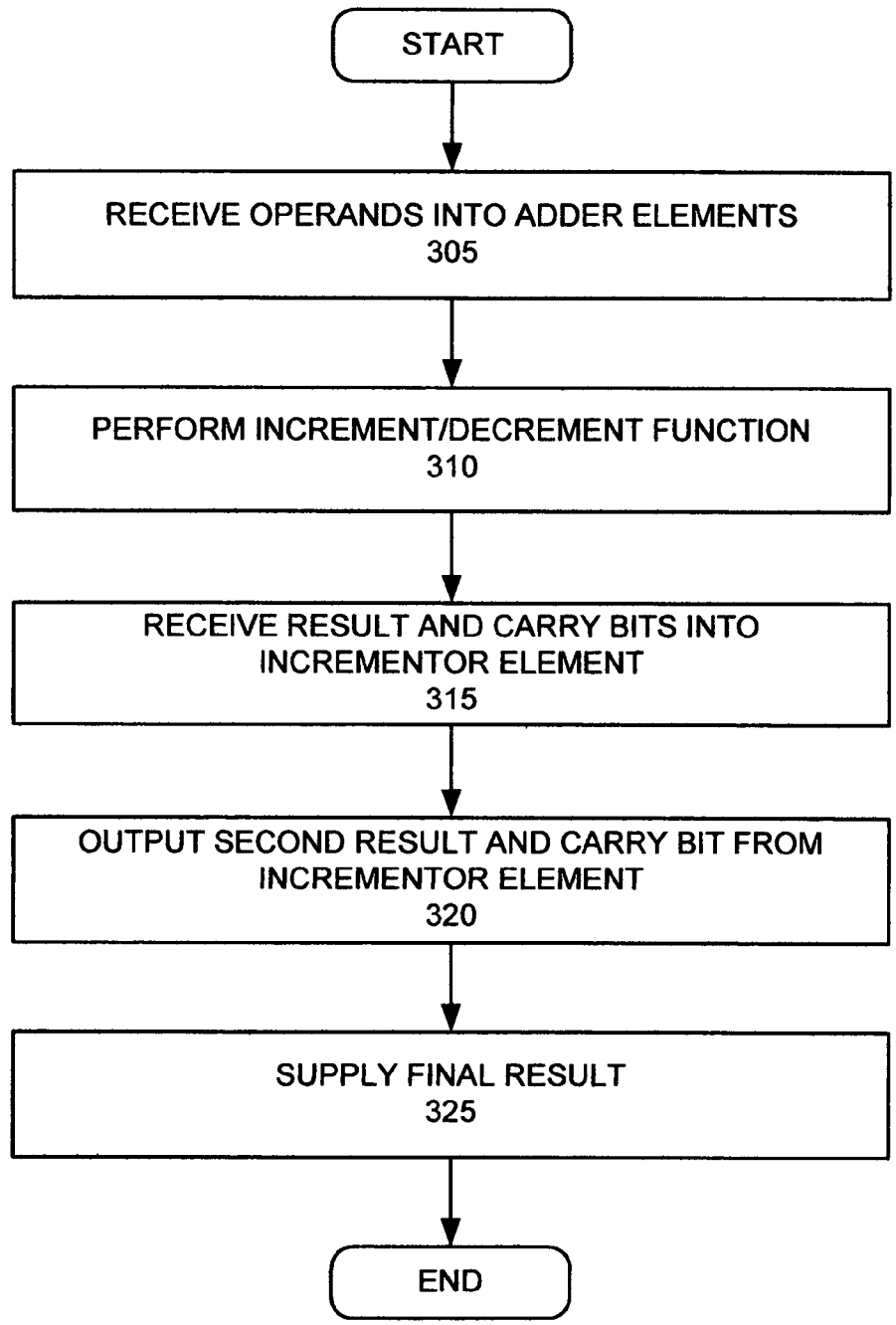
FIG. 3 is a flowchart of a process 300 for using a pipelined adder/subtractor to perform add/subtract functions as embodied by the present invention.

With reference to FIG. 2 and to step 305 of FIG. 3, N-bit operands are received into adder elements 211, 221, 231, and 241 on the first clock cycle. In the present embodiment, adder/subtractor 200 comprises input busses 205 (one for each operand) coupled to four pipelines 260–290 which perform the add/subtract function of the present invention. In other embodiments of the present invention, there can be any number of pipelines in adder/subtractor 200. Each of these pipelines has as its first stage, an adder element (e.g., adder elements 210, 220, 230, and 240). The adder elements are comprised of an adder (e.g., adders 211, 221, 231, and 241) and a single width (e.g., N-bit) register (e.g., registers 212, 222, 232, and 242). Because of the architecture of programmable logic devices, the adders and registers of the adder elements can be combined in one macrocell of logic per bit. The adders are simply combinatorial adder/subtractors which are well known in the art. They provide the basic mathematical function of: Sum=A+B plus a carry. The need for any double width registers is eliminated by placing the adder elements in the first stage of the pipeline.

With reference to FIG. 2 and to step 310 of FIG. 3, an add/subtract operation is performed in each of the adder elements in the first clock cycle. After receiving two N-bit operands from input bus 205, the adders perform an add/subtract function and output an N-bit result to their respective result registers (e.g., registers 212, 222, 232, and 242). The result registers are single width registers as only one N-bit result is output by the adders. Registers 214, 215, 228, 234, 244, and 246 are incorporated to hold the result from their respective adders or incrementors for latency while the other pipelines are performing their respective operations.

The adders also generate a carry out bit if the result is greater than will fit in the result registers. The carry out is a single bit which is sent to a single bit register (e.g., register 213) and held until it is sent to an incrementor. This carry out bit is used by the incrementor (e.g., incrementors 225, 236, and 248) of the next stage as a carry in. The multiple carry bit registers coupled with adders 231 and 241 are to hold the carry bit for latency while other pipelines are performing their respective operations. The result and carry bit registers are D-type flip-flops or other storage elements capable of holding the value of their input data from one clock edge to the next.

With reference to FIG. 2 and to step 315 of FIG. 3, an N-bit result and two carry bits are combined in an incrementor on the second clock cycle for pipestage 270, the third for pipestage 280, and the fourth for pipestage 290. In the second stage of adder/subtractor 200, incrementor element 225 receives an N-bit result from register 222, a carry bit from register 213, and a carry bit from register 223. Because of the architecture of a programmable logic device, an incrementor and a register can be combined in one macrocell level (e.g., increment elements 224, and 238). This allows better utilization of the macrocells in device 200 than that of the conventional art devices. Furthermore, the construction of an incrementor requires relatively few macrocells as opposed to the double registers necessary in the prior art implementation of a pipeline adder.

Figure 4:
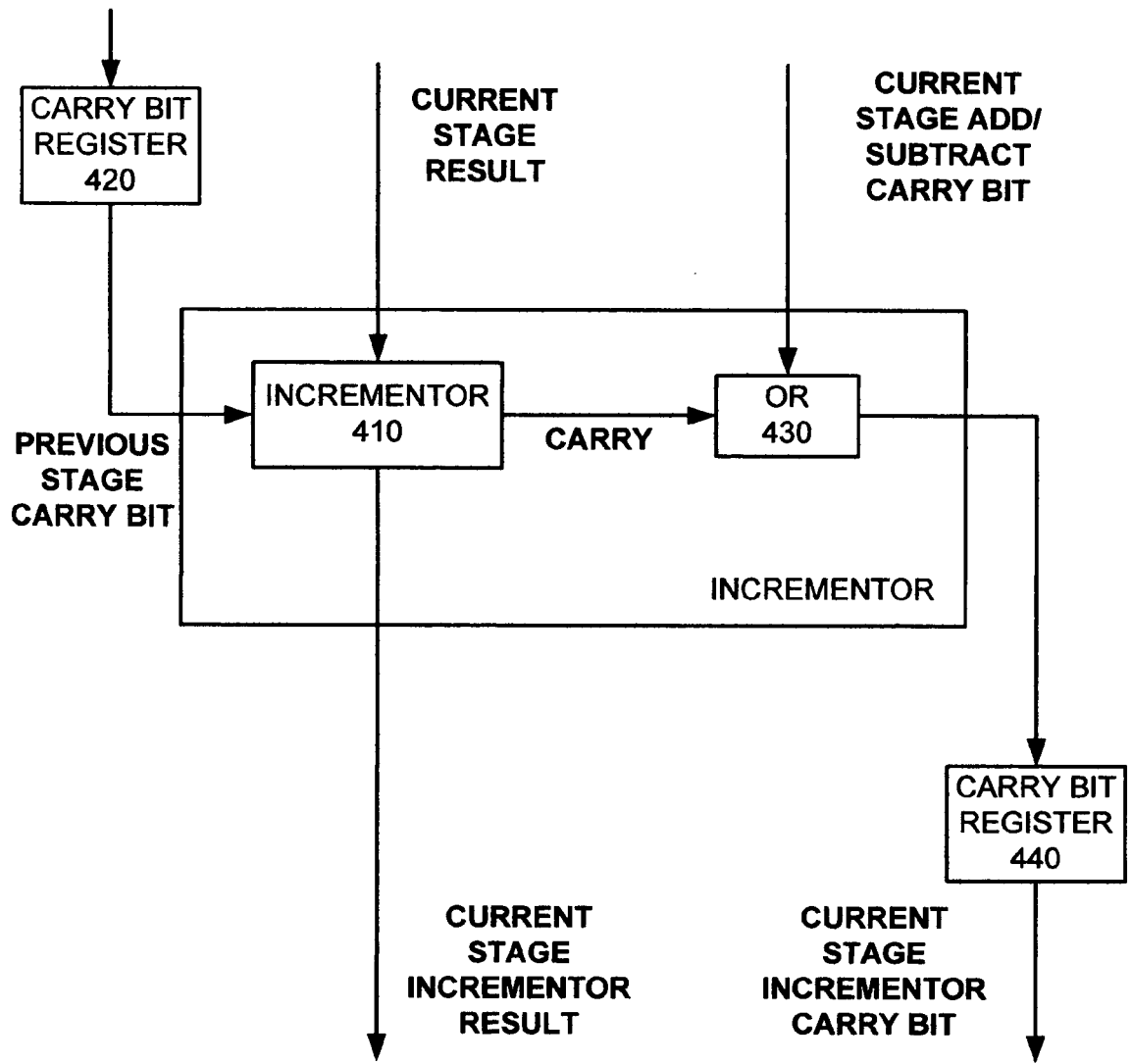
FIG. 4 is a block diagram of an incrementor device 400 utilized in embodiments of the present invention.

The function of an incrementor utilized in embodiments of the present invention is shown in greater detail in FIG. 4. For purposes of clarity, reference will be made to FIG. 4 and to incrementor 225 of FIG. 2. Incrementor 400 is comprised of a simple incrementor 410 and an OR gate 430. Incrementor 400 receives a first result into incrementor 410 from an adder element in its respective pipeline (e.g., adder element 220 of FIG. 2) as well as a first carry bit from a second adder element (e.g., adder element 210 of FIG. 2) in a different pipeline. Adder 410 performs an increment operation and outputs a second result and, if necessary, a carry bit.

The carry bit is input into OR gate 430 along with the first carry bit from the adder element 220. OR gate 430 performs a Boolean OR operation and outputs a second carry bit to carry bit register 440 (e.g., carry bit register 227 of FIG. 2). It is appreciated that in some embodiments of incrementor 400 the second result and second carry bit may be directly input into output bus 250 (e.g., incrementor 248 of FIG. 2). In other embodiments of incrementor 400, the second result and the second carry bit are stored in pipelined registers (e.g., registers 226 and 227 of FIG. 2).

The incrementors can perform their operation without adding any latency to the pipeline. Thus, in a two pipeline adder/subtractor, outputs from an incrementor are directly input into output bus 250 (e.g., incrementor 248) without adding any extra step of latency in the system. This pattern of pipelining the carry bit to the next stage continues until the last pipeline 290. The pipelines 260–290 then output their results on the last clock cycle and the carry bit from the incrementor of the last pipestage to create the final arithmetic result.

With reference to FIG. 2 and to step 320, a second result and carry bit are output from an incrementor. The result and the carry bit can be held in registers or, if necessary, directly input into output bus 250.

With reference to FIG. 2 and to step 325, a final arithmetic result is supplied. The final result is the combination of the result registers of each pipeline, the output of the incrementor in the last stage, and the carry bit from the incrementor in the last stage.

While the present invention has been described in reference to increment/decrement operations, it is not intended to be limited to these operations only. On the contrary, it is also applicable to any other circuitry that makes use of carry/borrow logic.

The preferred embodiment of the present invention, a fast pipelined adder/subtractor using increment/decrement function with reduced register utilization, is thus described. While the present invention has been described in particular embodiments, it should be appreciated that the present invention should not be construed as limited by such embodiments, but rather construed according to the following claims.

What is claimed is:

1. A method of performing a pipelined arithmetic function comprising the steps of:
   a) receiving two N-bit operands into each of a plurality of adder elements in separate pipelines;
   b) performing an add operation in each of said plurality of adder elements wherein a first N-bit result and a first carry bit is output from each of said adder elements;
   c) receiving said first N-bit result from each of said adder elements into a respective N-bit result register and receiving said first carry bit from each of said adder elements into a respective carry bit register;
   d) outputting from an incrementor in one of said pipelines, a second N-bit result and a second carry bit from the combination of a first result from a first of said N-bit result registers, a first carry bit from a first of said carry bit registers, and a first carry bit from a second of said carry bit registers from a second of said pipelines; and
   e) supplying a final result being a combination of said second N-bit result from said incrementor, said second carry bit from said incrementor, and said first N-bit result from a second N-bit result register in said second pipeline.

2. The method as recited in claim 1, wherein said N-bit result registers are single width registers.

3. The method as recited in claim 1, wherein said carry bit registers are single bit registers.

4. The method as recited in claim 1, wherein step c) further comprises respectively receiving said first N-bit result into a plurality of single width N-bit registers.

5. The method as recited in claim 1, wherein step c) further comprises respectively receiving said first carry bit into a plurality of single bit registers.

6. The method as recited in claim 1, wherein step d) further comprises respectively receiving said second N-bit result into a plurality of single width N-bit registers.

7. The method as recited in claim 1, wherein step d) further comprises receiving said second carry bit into a plurality of single bit registers.

8. A pipelined adder/subtractor comprising:
   a) a plurality of adder elements coupled to a plurality of input busses and operable to perform add/subtract operations upon a pair of N-bit operands received from said input busses and storing an N-bit result;
   b) a carry bit register coupled to each of said adder elements and for receiving a carry bit from said adder element;
   c) an incrementor coupled to a first of said adder elements, a first of said carry bit registers, and a second of said carry bit registers, said incrementor having an N-bit result output and a carry bit output; and
   d) an output bus coupled to said N-bit result output of said incrementor, said carry bit output of said incrementor, and a second of said incrementor elements.

9. The pipelined adder/subtractor of claim 8, wherein said plurality of adder elements store said N-bit results in respective single width registers.

10. The pipelined adder/subtractor of claim 8, wherein said carry bit registers are single bit registers.

11. The pipelined adder/subtractor of claim 8, further comprising a plurality of N-bit registers for respectively receiving said first N-bit result from said plurality of adder elements.

12. The pipelined adder/subtractor of claim 11, wherein said plurality of N-bit registers are single width registers.

13. The pipelined adder/subtractor of claim 8, further comprising a plurality of N-bit registers for respectively receiving said second N-bit result from said second N-bit output of said incrementor.

14. The pipelined adder/subtractor of claim 13, wherein said plurality of N-bit registers are single width registers.

15. The pipelined adder/subtractor of claim 8, further comprising a plurality of said carry bit registers for respectively receiving said carry bits from said adder elements and said incrementor.

16. A multistage adder/subtractor circuit comprising:
   a) a plurality of pipelines connected to a plurality of input busses, each of said pipelines being divided into clock regulated stages and having in its first stage a adder element comprising:
      an adder for receiving a pair of N-bit operands and outputting a first N bit result and a first single bit carry; and
      a single width N-bit register for receiving said first N-bit result from said adder; and
      at least one of said pipelines comprising, in a stage subsequent to said adder element stage, an incrementor element comprising:
         an incrementor for receiving one of said first N-bit results and two of said first single bit carries and outputting a second N-bit result and a second single bit carry; and
         a single width N-bit register for receiving said second N-bit result;
   b) a plurality of single bit registers for receiving said carry bits; and
   c) an output bus connected to said pipelines for supplying a final result being a combination of said first N-bit result, said second N-bit result, and said second single bit carry.

17. The pipelined adder/subtractor of claim 16, further comprising a plurality of single width N-bit registers for respectively receiving said first result from said plurality of adder elements.

18. The pipelined adder/subtractor of claim 16, further comprising a plurality of single width N-bit registers for respectively receiving said second result from said incrementor elements.

19. The pipelined adder/subtractor of claim 16, further comprising a plurality of said carry bit registers respectively receive said carry bits from said adder elements and said incrementor elements.

* * * * *